(12) United States Patent
Lüttge

(10) Patent No.: US 9,130,440 B2
(45) Date of Patent: Sep. 8, 2015

(54) WINDING METHOD FOR PRODUCING ELECTRIC COILS

(75) Inventor: Wolfgang Lüttge, Hameln (DE)

(73) Assignee: Aumann GmbH (DE)

( * ) Notice: Subject to any disclaimer, the term of this patent is extended or adjusted under 35 U.S.C. 154(b) by 538 days.

(21) Appl. No.: 13/501,562

(22) PCT Filed: Oct. 12, 2010

(86) PCT No.: PCT/EP2010/006205
§ 371 (c)(1),
(2), (4) Date: May 1, 2012

(87) PCT Pub. No.: WO2011/045016
PCT Pub. Date: Apr. 21, 2011

(65) Prior Publication Data
US 2012/0205482 A1    Aug. 16, 2012

(30) Foreign Application Priority Data

Oct. 12, 2009 (EP) .................................. 09012858

(51) Int. Cl.
*H02K 15/09* (2006.01)
*H02K 15/095* (2006.01)
*H01F 41/06* (2006.01)

(52) U.S. Cl.
CPC .......... *H02K 15/095* (2013.01); *H01F 41/0633* (2013.01)

(58) Field of Classification Search
USPC ................................. 242/433.4, 432.5, 432.6
See application file for complete search history.

(56) References Cited

U.S. PATENT DOCUMENTS

| 3,458,145 | A | * | 7/1969 | Eichelmann | 242/432.5 |
| 5,732,900 | A | * | 3/1998 | Burch | 242/432.5 |
| 6,098,912 | A | * | 8/2000 | Noji | 242/432.5 |
| 6,685,127 | B2 | | 2/2004 | Takano et al. | |
| 7,017,850 | B2 | * | 3/2006 | Stratico et al. | 242/432.3 |
| 2003/0168547 | A1 | * | 9/2003 | Komuro et al. | 242/432.5 |
| 2012/0228421 | A1 | * | 9/2012 | Heffelfinger | 242/432.5 |
| 2012/0267979 | A1 | * | 10/2012 | Yoshida et al. | 310/214 |

FOREIGN PATENT DOCUMENTS

| DE | 102007037611 | 6/2009 |
| EP | 1315268 | 5/2003 |
| EP | 1898494 | 3/2008 |
| JP | 1311853 | 12/1998 |

(Continued)

OTHER PUBLICATIONS

International Search Report for PCT application PCT/EP2010/006205, EPO Jul. 29, 2011.

(Continued)

*Primary Examiner* — Emmanuel M Marcelo

(57) ABSTRACT

A winding method for producing, for example, electric coils, wherein strand-shaped winding material (8) fed by means of a feeding device (7) is wound onto a carrier body having a non-circular cross-section by means of moving the winding material (8) and the carrier body relative to each other. Prior to placing the winding material (8) onto the surface to be wound, a force is applied onto the material transversely to the longitudinal extension thereof such that the strand-shaped winding material conform to the shape of the surface of the carrier body having a non-circular cross-section.

15 Claims, 4 Drawing Sheets

(56) References Cited

FOREIGN PATENT DOCUMENTS

| | | |
|---|---|---|
| JP | 2003061320 | 2/2003 |
| JP | 2004274850 | 9/2004 |
| JP | 2004343951 | 12/2004 |

OTHER PUBLICATIONS

Written Opinion of PCT application PCT/EP2010/06205, EPO Oct. 13, 2011.
English Translation of International Search Report for PCT application PCT/EP2010/006205, EPO Jul. 29, 2011.

* cited by examiner

WINDING METHOD FOR PRODUCING ELECTRIC COILS

TECHNICAL FIELD

The invention relates to a method for orderly turn-by-turn winding of strand-shaped material onto a carrier body that has a non-circular cross-section with respect to the winding axis, and in particular for achieving a contour-conforming end position of the strand-shaped material on the carrier body by applying a defined transverse force already in the area between this point of engagement and the outlet point from the winding material feeding device to the strand-shaped material, and to an apparatus therefore.

BACKGROUND INFORMATION

Strand-shaped material in the context of the present invention (hereinafter also referred to as winding material) comprises wire-, braid-, filament-, rope-, or fiber-type materials, in particular of electrically conductive material, having a uniform cross-section throughout its length and the characteristic of being flexible and absorbing plastic and/or elastic deformations. Generally, this winding material is provided with an electrically insulating sheath. Appropriate materials can be formed into coils around the carrier body, turn by turn, by a relative movement between the carrier body and the strand-shaped material feeding device.

An example for the strand-shaped material is enameled copper wire which may be provided as a round wire or a flat wire. Carrier bodies with non-circular cross-sections are, for example, the pole teeth of laminated sheet metal packages of electric motors. For functional performance of the electric motor, energizable coils have be to applied thereto. However, between two adjacent pole teeth which radially extend inwards or outwards from a circular ring that is referred to as a yoke, there is only limited usable space available which often provides only limited accessibility. This space should be utilized to an optimum.

There are limits to such a maximum utilization of the winding space for current-carrying conductor cross-sections (maximization of the filling factor). These limits result on the one hand from the geometry of the strand-shaped winding material due to which so-called gore spaces between round wires cannot be avoided. On the other hand, limits are imposed by the employed winding method when a wire fails to be placed in contour-conforming manner along the surface line of a carrier body, such as for example a pole tooth.

'Contour-conforming' is to be understood as a continuous tangential engagement of the winding material to the surface of the carrier body to be wound with respect to the circumferential length of a turn between two corner points of the cross-section that act as bending points, all this considered for the first layer of a coil. For all further layers of a so started coil, 'contour-conforming' means a continuous tangential engagement of the winding material to the contour-conformingly laid turns of the preceding layer.

Contour-conforming laying is influenced, and in particular impeded, by material properties of the winding material, because the material opposes a change of shape induced by the bending operation during winding by plastic or elastic reactions. While a circular cross-section of the carrier body results in a continuous, constant bending stress of the winding material for which the tension force to be applied can be optimized, a rectangular cross-section, e.g., having a length/width ratio>>1 as is typical for tooth poles, results in an abruptly increasing bending stress at the deflection points of the four corners, followed by laying up the wire on the adjoining side of the carrier body with hardly any load. This permits the wire to spring back which then causes that the turn forms a bulge relative to the carrier body. The resulting space between the turn and the carrier body is lost for laying up useful conductor cross-sections.

If instead of a round enameled copper wire a flat wire is used, for example, the conditions for the transfer of a wire from a wire nozzle or guidance roller to the carrier body is further complicated. The term 'bulge', also referred to as 'bulging' describes a laid-up state of the winding material on the carrier body wherein one turn or all turns laid in the same section between two bending deflection edges fail to be laid with contour-conforming engagement. The bulge or bulging is the space between the surface of the carrier body and the most proximate turn, measured in the middle of the distance between two adjacent bending deflection edges. The extent of bulging depends on the wire diameter, the applied tension force and the distance between the bending deflection points.

Another hindrance for a contour-conforming lay-up of the winding material is the accessibility of the carrier body for the winding material laying device, which accessibility is given by the geometry of the product. This is especially of concern if the carrier bodies are provided as a multi-tooth pole assembly, to remain with the example of tooth poles. The accessibility of the winding space limits the degrees of freedom available for adjusting the winding material supplying device to an optimum, in terms of distance, direction, and guiding action with respect to the lay-up point on the surface of the carrier body. The winding material supplying device has to be adapted to the conditions of accessibility. Tubular nozzles, for example, have proved suitable for this purpose, which nozzles can operate in the winding space and perform a translational relative movement with respect to the carrier body, while the carrier body itself realizes a complementary pivoting movement.

There are prior art solutions to achieve a closely packed arrangement of the strand-shaped winding material, in particular winding wire, and a maximum possible utilization of the theoretically available winding space between opposing flanks of two support bodies, such as tooth poles of stators for electric motors. An additional condition resulting therefrom is that the thereby approaching sides of the coils in such a winding space adapt to form almost parallel flanks, however with a corrugation of their circumferential contour which may, for example, correspond to half the diameter of a round winding wire. A bulging which may arise during the winding of the coil at the longitudinal sides thereof is detrimental to this objective.

Among the proposals for solution, orthocyclic laying of the winding layers of such a coil holds a special place, because of the high fill factor obtainable. Orthocyclic winding means that the turns of a round wire coil are not formed in helically progressing manner on the circumferential surface of the carrier body; namely, in case of helical formation larger gore spaces result at the flanks of limiting flanges, and moreover the opposite handedness of successive layers ultimately results in a pell-mell of individual turns which interrupts the desired side-by-side winding of the turns and results in a so-called wild layer structure with packing density losses. Instead, in orthocyclic winding the turns are laid at an angle of 0° to the axis of rotation of, e.g., a cylindrical carrier body, and before completion of a full turn the wire is deflected by the amount of its diameter, within a short circumferential length.

DE 10 2007 037 611 B3 proposes to place the point of discontinuity in the turns of an orthocyclic coil at a narrow end face of the pole tooth, because it is there where it causes the least disturb of the relative flatness of the opposing longitudinal surfaces of adjacent pole coils. In order to reliably obtain the jump in the turns at the narrow side and to achieve a reliable transition to the adjoining longitudinal side, the carrier body is provided with a special contour. This comprises to form one of the two longitudinal sides of the contour with a prolonged length, whereby a larger laying length results at the corresponding, now inclined end face which can be used to realize the jump. In addition, a beneficial fixing effect is obtained at the sharp corner of about 60° for the wire deflected there. A disadvantage is the acceptance of an axial prolongation of the carrier body beyond the minimum size functionally required for the stator of the motor.

An object in DE 10 2007 002 276 A1, equally, is to use the existing winding space of a pole tooth coil as efficiently as possible and therefore to avoid individual turns or overcrossing turns to project from the longitudinal sides of the coils, by applying orthocyclic winding, modified for the case of an odd number of layers and the default to place both ends of the coil at the same flange side. To this end, the jump of the turns and the winding layer jump is spread at the longitudinal sides. Thus, an embedment is provided for the spread windings of the last layer by offsetting the projecting overcrossings to the less critical end faces.

EP 1315268 A1 describes a coil wound around a pole tooth according to the above mentioned winding technique with bulging at the longitudinal sides. To avoid an unwanted bulge, a complex winding unit is proposed by means of which the coils of a strong round wire—such as particularly required for products in the automotive sector due to the on-board wiring low voltages—are pre-wounded separately, which is done under cyclic activation of radially adjustable bending rams and the like. This is only possible because accessibility is enabled by holding the winding tool separated. It is even accepted here, that the placed pole coils cannot be wound in a connected assembly with complete strands.

SUMMARY

An object of the invention is to provide a winding method and a corresponding apparatus for contour-conforming laying of strand-shaped material onto non-circular carrier bodies, wherein the disadvantages mentioned above are eliminated and in particular bulging of the coiled winding material is minimized.

According to the invention, the strand-shaped winding material which is wound around a carrier body having a non-circular cross-section to produce a coil, such as an enameled copper wire, assumes its winding shape under an axial tension force not only by the resulting deflection at the point of tangential engagement on the surface line of the carrier body, rather the strand-shaped winding material is subjected to a defined transverse force already in the area between this point of engagement and the outlet point from the winding material feeding device. In the mentioned area, this transverse force applies an elastic through plastic pre-stress to the winding material and thus influences the behavior of the winding material when engaging the carrier body and while progressively forming turns with a lasting effect. The defined transverse force completely or sufficiently partially compensates for the tendency of the laid wire to form a bulge between the bending points at the corners of a carrier body cross-section having a polygonal or non-circular contour instead of a tight contour-conforming engagement thereof.

The transverse force of the winding method according of the invention is directed such that it deflects the free section of the strand-shaped winding material between the engagement point and the outlet point to form two mutually angled sections.

The inventive transverse force of the method is not constantly applied to the strand-shaped winding material during one turn, rather it is activated cyclically in function of the contour section of the carrier body surface line which is passed at this moment by the wandering engagement point. It is particularly important to prevent bulging at the longitudinal sides of the coil, because pairs of these longitudinal sides directly face each other across the winding space formed by the longitudinal sides of two adjacent carrier body. Therefore, the objective of a contour-conforming lay-up of the turns especially applies to that part of a turn, whereas a remaining bulge at the small sides of the carrier body or coil may be tolerated. The point of application and the direction of the transverse force change during one turn in function of the relative position of the outlet point from the feeding device with respect to the carrier body.

The term carrier body surface for contour-conforming laying of turns as used herein is not only a component's surface as it exists before the winding starts but in progress of winding also the thereby forming envelope contour parallel to the component's surface which is formed by laying the turns side by side as a layer having a corrugation of half the diameter of the strand. This surface will be referred to below as the current carrier body surface or surface to be wound. The corrugation resulting from the radii of adjacent strands may extend helically on the lay-up surface, or, in case of a so-called orthogonal winding, may be aligned perpendicular to the axis of the carrier body along about 60% of the carrier body's circumference. Orthogonal winding favorably promotes the principle of the method according to the invention and its objective of contour-conforming laying.

The solution as claimed in the method is realized by a device which uses a preforming element which can be engaged at the strand of winding material to apply the lateral force. The preforming element, which is for example a rod of any cross-section or a tube, is movably arranged in parallel to the longitudinal axis of the outlet nozzle which serves as a feeding device for the strand-shaped winding material, so as to be displaceable into engagement at the strand of winding material according to the invention. The feeding device preferably formed as a cylindrical nozzle and the associated preforming element form a unit. Depending on the applied winding principle or relative movement between the feeder device and the carrier body, the preforming element has to be assembled in this unit.

In the stroke-pivotal technique of the needle winding technology, the unit moves around the carrier body in a paternoster-type movement. By contrast, in the rotational winding technique, the flyer winding technology, the unit moves around the carrier body with an always radially directed alignment, so that in this case two preforming elements are provided in the unit so that the lateral force can be applied as intended by the invention. Advantageously, for adaptation to the respective winding task, the preforming element comprises a base portion provided with an actuator, and a replaceable head portion for engaging the winding material strand and deflecting it according to the invention. In the base portion, the positive fitting support may be cylindrical, so that the head portion inserted therein can be rotated before it is fixed.

If an outlet nozzle is provided as a feeding device, it can be pivoted by 90°, for additional functions, which pivotal movement is performed together with or independently of the two preforming elements. This additional function may also be used to sever the strand of winding material using a separating element in a manner that does not give rise to a local bulging of the last turn portion.

In the present context it is noted that the terms "comprise", "have", "include", "contain", "for example", and "in particular", and grammatical variations thereof as used in the specification and claims of features are generally intended to denote a non-exhaustive listing of features such as method steps, means, ranges, sizes, and the like, without in any way excluding the presence of other or additional features or groups of other or additional features.

BRIEF DESCRIPTION OF THE DRAWINGS

The invention will now be described in more detail with reference to the accompanying drawings which illustrate exemplary embodiments and wherein.

DETAILED DESCRIPTION OF THE PREFERRED EMBODIMENTS

Figure 1:
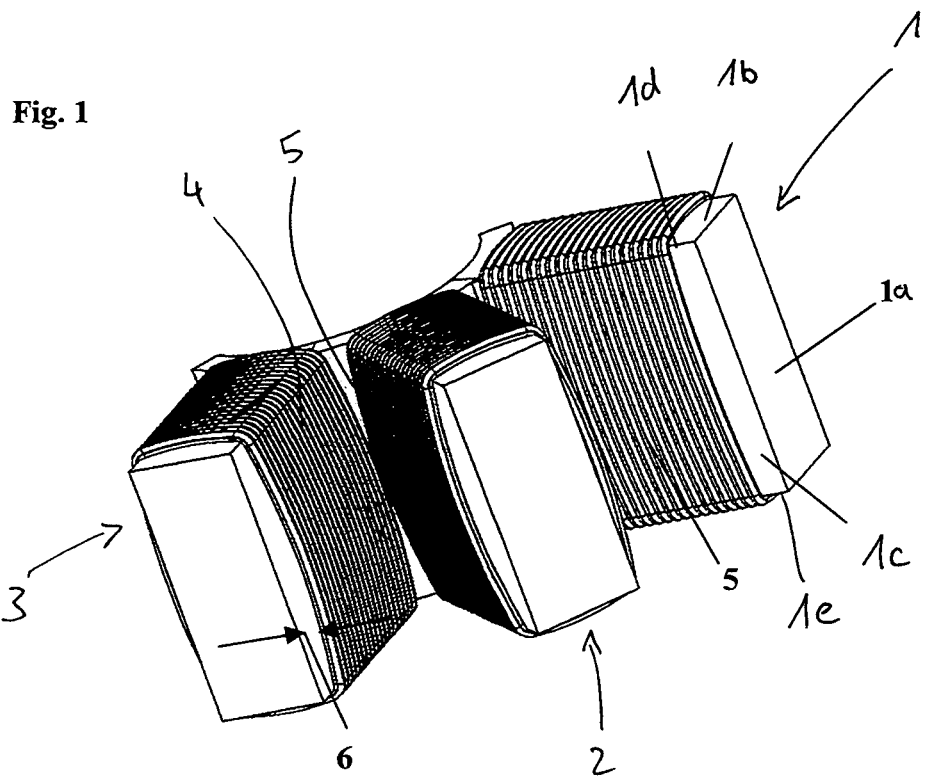
FIG. 1 shows a group of non-circular carrier bodies, each of which supports a coil with a bulge on the opposing flank sides, as known from prior art.

FIG. 1 shows the prior art. Shown are three carrier bodies 1, 2, 3, each having a rectangular end face 1a with a circumferential line that is the decisive contour for forming the turns and is composed of lengths 1c and widths 1b and includes bending edges 1d, 1e. Coil 5 has a bulge 6, in particular at flank sides 1c where the winding material is spaced from the flank surface 1c. Due to the bulge 6, the adjacent coils 4, 5 approach in an undesirable manner, which limits the intended extent of the turns over the total available length of the carrier body 1, 2, 3 along edge 1d.

Figure 2A:
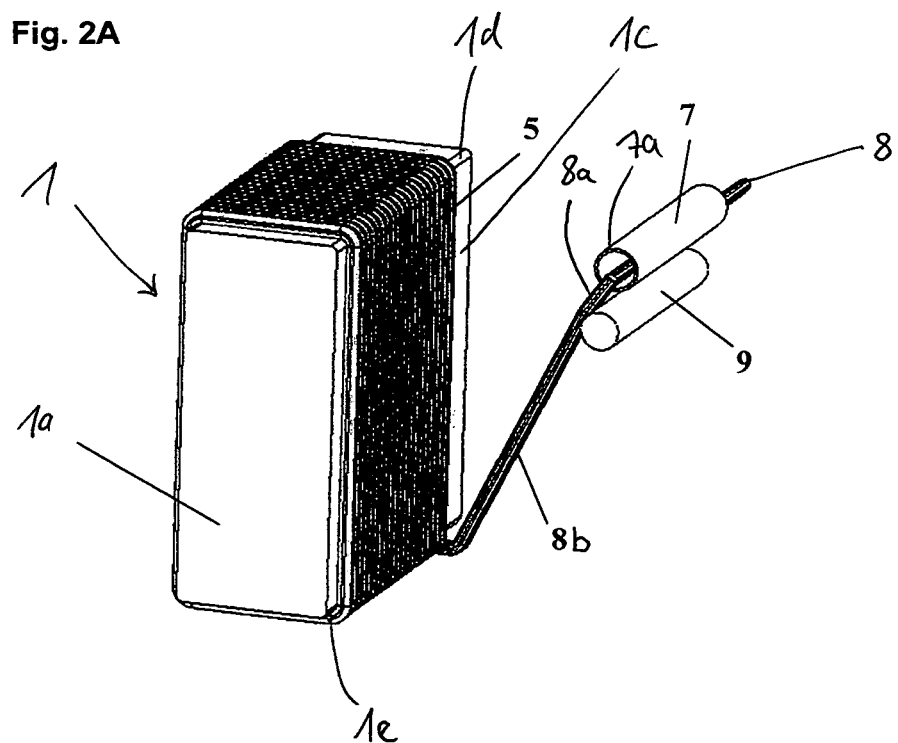
FIG. 2A illustrates the principle solution according to the invention.

FIG. 2A shows the principle of the inventive solution to avoid the unwanted bulging. On a carrier body 1 having an end face 1a and a rectangular cross-section, as shown in the example, the strand-shaped winding material 8, for example an enameled copper wire, is to be laid. To this end, an outlet nozzle 7 is preferably provided for supplying the winding material 8. Nozzle 7 has a preforming element 9 associated therewith, which in the example shown is cylindrical and which can be moved in parallel to the longitudinal axis of nozzle 7. In the illustrated situation, the winding material 8 is being bent around the lower bending edge 1e of carrier body 1, and a portion 8b thereof is to be laid to the side 1c of carrier body 1 and is then to be guided around upper bending edge 1d. In the illustrated situation, the preforming element 9 is pressed against the supplied strand of winding material 8 exiting from nozzle 7, so that it is deflected in defined manner from its position stretched in its longitudinal direction between bending edge 1e and the outlet of nozzle 7. Thereby a bend is produced in the stranded material, which divides the corresponding portion of the strand between bending edge 1e and outlet 7a of nozzle 7 into mutually angled sections 8b and 8a. By the applied transverse force, the winding material 8 is subjected to a pre-stress which compensates for a later bulging during laying.

Figure 2B:
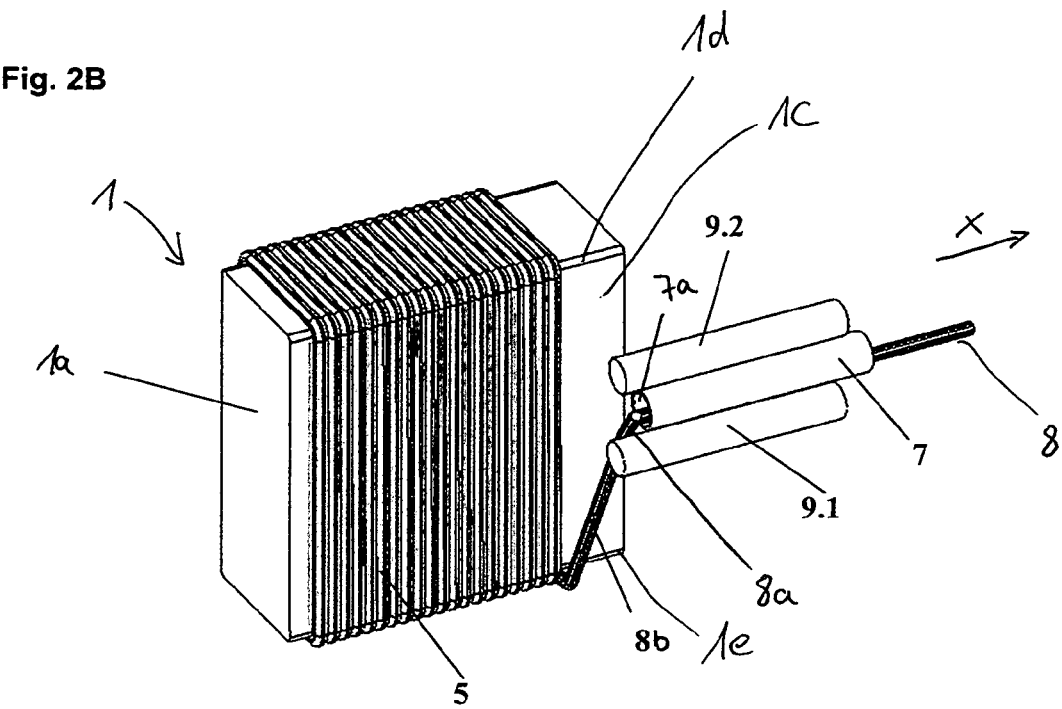
FIG. 2B is a variation of the embodiment of FIG. 2A.
Figure 2C:
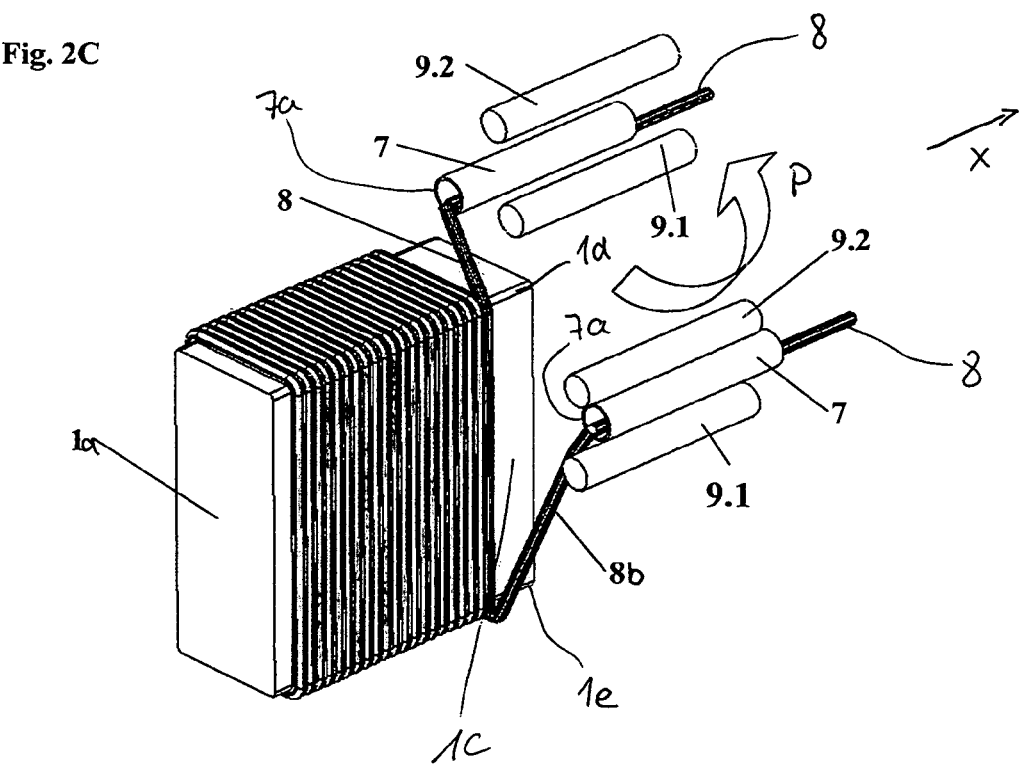
FIG. 2C is a variation of the embodiment of FIG. 2B with two operation modes of the preforming elements.
Figure 2D:
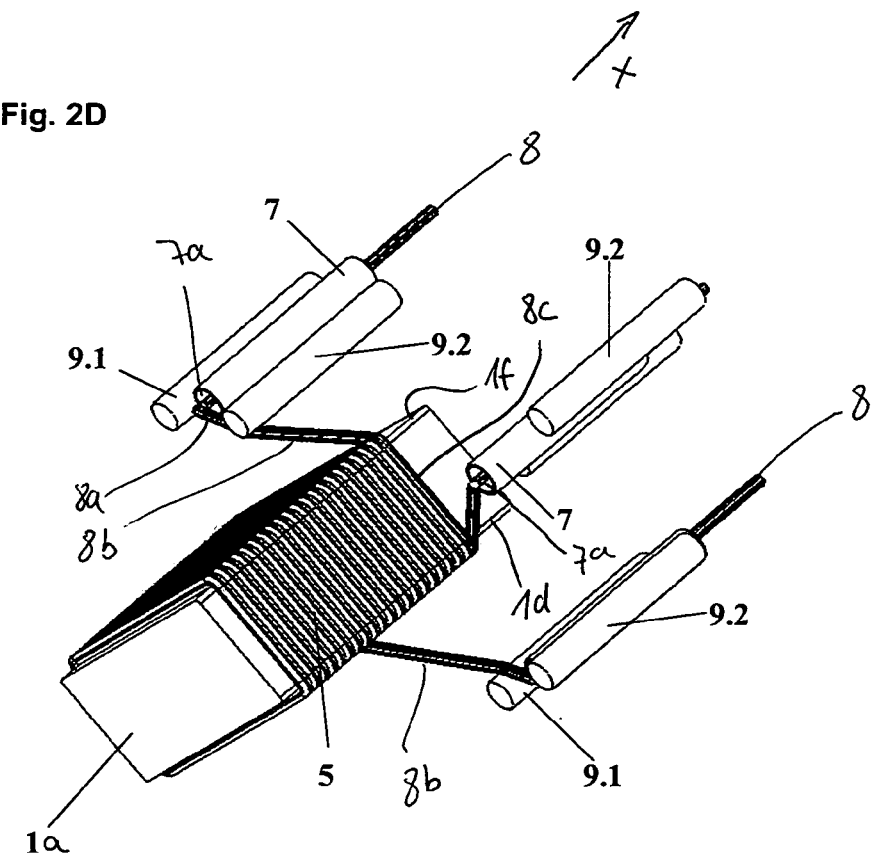
FIG. 2D is a variation of the embodiment of FIG. 2B which illustrates the operating states of the preforming elements according to the invention for one turn.

FIGS. 2B to 2D show a particular embodiment of the invention with preforming elements 9.1, 9.2 disposed at both sides of nozzle 7. Depending on the applied winding method it may be necessary to have a plurality of preforming elements 9.1, 9.2 associated with wire outlet nozzle 7. In the example shown, two preforming elements 9.1, 9.2 are associated with wire outlet nozzle 7 and positioned at approximately both sides of nozzle 7. In FIG. 2B, preforming 9.1 element effects deflection of the winding material 8 as described above; the corresponding portion of the winding material 8 is then laid onto side 1c of body 1 to be wound. Previously, the unused preforming element 9.2 is moved in direction X parallel to nozzle 7 so as to not impede the placement of the winding material 8. Nozzle 7 then continues to move in the direction of arrow P (which indicates the winding direction) around the body 1 to be wound and thereby lays the winding material 8 around bending edge 1d (FIG. 2C). At this moment, preforming elements 9.1, 9.2 are not required, so they are driven back relative and in parallel to nozzle 7 in the X direction, so that they do not impede the lay-up of winding material 8. The group of nozzle 7 and preforming elements 9.1, 9.2 continues to move behind bending edge 1d along the narrow side of carrier body 1 to place the corresponding portion 8c of the winding material onto the narrow side. Then, nozzle 7 passes around the rear bending edge 1f between which and bending edge 1d the portion 8c had been laid. The winding material 8 is again bent at bending edge 1f to be then laid onto the opposite side of side 1c. In this moment, preforming elements 9.1, 9.2 are returned frontwards (direction –X) in parallel to the nozzle, and the preforming operation according to the invention is repeated on the rear side, with the preforming element 9.2 applying a deflection force to the winding material transversely to the feeding direction of the winding material 8 (FIG. 2D).

The embodiment of the method illustrated in FIGS. 2B to 2D is particularly suitable for the flyer winding technique. For other winding techniques, a different number of preforming elements can be used, if necessary.

Figure 3A:
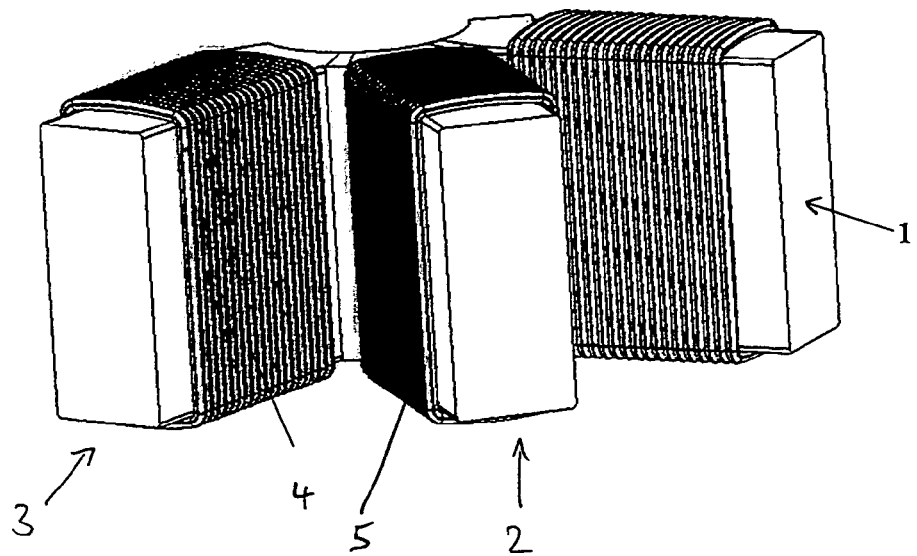
FIGS. 3A and 3B show variations of a group of non-circular carrier bodies, each of which supports a coil of contour-conforming turns according to the invention.
Figure 3B:
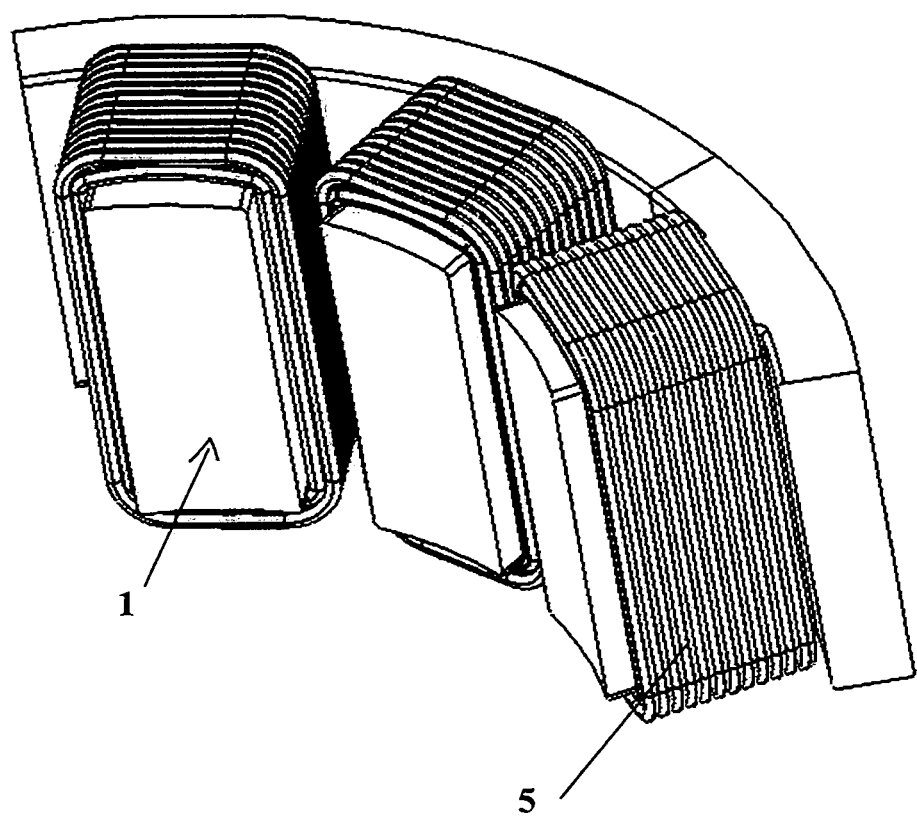

The invention provides a system and method to produce windings around various constellations of carrier bodies. FIG. 3A shows an example of a group of three externally grooved carrier bodies 1—similar to those of FIG. 1. It can be seen that a bulging of the windings has been avoided, in particular at the longitudinal sides. Coils 4 and 5 do not adjoin any longer in the back part, there is a sufficient space. As shown in FIG. 3B, the same can be obtained according to the invention with a group of three internally grooved carrier bodies 1.

Modifications and substitutions by one of ordinary skill in the art are considered to be within the scope of the present invention, which is not to be limited except by the allowed claims and their legal equivalents.

The invention claimed is:

1. A winding method, for producing electric coils, wherein a strand-shaped winding material (8) fed by means of a feeding device (7) is wound onto a carrier body (1-3) having a non-circular cross-section by moving the strand-shaped winding material (8) and the carrier body (1-3) relative to each other, characterized in that before laying up the strand-shaped winding material (8) onto said carrier body having a non-circular cross-section (1-3), a force is applied to the strand-shaped winding material (8) transversely to a longitudinal direction of the strand-shaped winding material (8) exiting said feeding device (7), wherein said transversely applied force is applied to said strand-shaped winding material (8) after said strand-shaped winding material (8) exits said feeding device (7) and before said strand-shaped winding material (8) is layed up onto said non-circular cross-section carrier body (1-3).

2. The winding method as claimed in claim 1, wherein said transversely applied force applied to the strand-shaped winding material (8) has at least one force component transverse to a lay-up direction of the strand-shaped winding material (8) to be placed on the surface to be wound.

3. The winding method as claimed in claim 1, wherein said transversely applied force applied to the strand-shaped winding material (8) has at least one force component pointing in a direction of the carrier body.

4. The winding method as claimed in claim 1, wherein the strand-shaped winding material (8) is selected from the group consisting of a wire, a braid, and rope-shaped electrical conductor.

5. The winding method as claimed in claim 1, wherein said carrier body is a component of electric motors, and wherein said component of electric motors includes inner or outer pole stators of electric motors.

6. The winding method as claimed in claim 1, wherein relative movement between the carrier body and the strand-shaped winding material (8) is effectuated by a method selected from the group of methods consisting of, rotational winding with a stationary lay-up nozzle, flyer winding with a rotating lay-up nozzle, and stroke-pivotal winding with a nozzle guided along a path is employed.

7. The winding method as claimed in claim 1, wherein said transversely applied force subjects the strand-shaped winding material (8) to a pre-stress configured to influences the behavior of the strand-shaped winding material (8) when engaging with the carrier body and while progressively forming turns with such a lasting effect that the tendency of the strand-shaped winding material (8) to form bulges between bending points on the carrier body (1-3) is completely or sufficiently partially compensated for.

8. An apparatus for carrying out the winding method as claimed in claim 1, comprising said feeding device (7) for feeding the winding material (8), and a support for fixing the carrier body to be wound, wherein the feeding device (7) and the carrier body are adapted to be movable relative to one another, characterized by at least one preforming element (9, 9.1, 9.2) which is movable relative to said feeding device (7) and displaceable between a rest position and an engaged position.

9. The apparatus as claimed in claim 8, wherein said at least one preforming element (9, 9.1, 9.2) has a holding and guiding part which is detachably mounted to an actuator.

10. The apparatus as claimed in claim 8, wherein said feeding device (7) and said at least one preforming element(s) (9, 9.1, 9.2) associated therewith are provided as a unit.

11. The apparatus as claimed in claim 8, wherein said at least one preforming elements (9, 9.1, 9.2) are substantially arranged in a plane parallel to a longitudinal axis (X) of the feeding device (7), and arranged in plane with their axes in parallel.

12. The apparatus as claimed in claim 8, wherein said feeding device (7) is pivotable.

13. The apparatus as claimed in claim 8, wherein said at least one preforming element (9, 9.1, 9.2), when in its engaged position, is able to apply a lateral force to the strand-shaped winding material (8) after said strand-shaped winding material (8) exits said feeding device (7), to subject it to a pre-stress which influences the behavior of the strand-shaped winding material (8) when engaging the carrier body and while progressively forming turns with such a lasting effect that the tendency of the strand-shaped winding material (8) layed up on said carrier body to form bulges between the bending points is completely or sufficiently partially compensated for.

14. A winding method for producing electric coils, wherein a strand-shaped winding material (8), fed by means of a feeding device (7), is wound onto a carrier body having a non-circular cross-section by moving the strand-shaped winding material (8) and the carrier body relative to each other, said method comprising the acts of:
before laying up the strand-shaped winding material (8) onto said carrier body, a force is applied to the strand-like winding material transversely to a direction of the strand-shaped winding material (8) exiting said feeding device (7), and further including a support for holding the carrier body to be wound, wherein the feeding means (7) and the carrier body are adapted to be movable relative to one another, further including at least one preforming element (9, 9.1, 9.2) which is movable relative to said feeding device (7) and displaceable between a rest position and an engaged position, and wherein said feeding device (7) is pivotable.

15. An apparatus for winding a strand-like material (8) onto a carrier body having a non-circular cross-section, comprising:
a feeding device (7), configured for feeding a strand-like winding material (8);
a support, configured for holding said carrier body having a non-circular cross-section on which said strand-like material (8) is to be wound; and
at least one preforming element (9, 9.1, 9.2) which is selectively movable relative to said feeding device (7) and displaceable between a rest position and an engaged position, wherein said at least one preforming element (9, 9.1, 9.2) is configured, in said engaged position, to selectively apply a force to the strand-like winding material transversely to a longitudinal direction of the strand-shaped winding material (8) exiting said feeding device (7), wherein said selectively transversely applied force is applied to said strand-shaped winding material (8) after said strand-shaped winding material (8) exits said feeding device (7) and before said strand-shaped winding material (8) is layed up onto said non-circular cross-section carrier body (1-3).

* * * * *